United States Patent [19]

Bristow

[11] Patent Number: 5,438,940
[45] Date of Patent: Aug. 8, 1995

[54] MANUAL PLANT SETTING DEVICE AND METHOD OF SETTING PLANTS

[76] Inventor: William L. Bristow, Rte. 3, Box 455, Frankston, Tex. 75763

[21] Appl. No.: 97,648

[22] Filed: Jul. 26, 1993

[51] Int. Cl.6 .................................................. A01C 11/02
[52] U.S. Cl. ..................................... 111/115; 111/98; 111/99
[58] Field of Search ................... 111/115, 117, 98, 99, 111/89; 172/371, 381

[56] References Cited

U.S. PATENT DOCUMENTS

| 15,114 | 6/1856 | Atkins | 111/98 |
|---|---|---|---|
| 1,563,625 | 12/1925 | Harry | 111/98 |
| 2,439,524 | 4/1948 | Moore | 111/99 X |
| 3,027,856 | 4/1962 | Dannevig | 111/99 X |
| 3,797,417 | 3/1974 | Hahn | 111/115 |
| 4,011,612 | 3/1977 | Atkinson | 7/14.55 |
| 4,082,048 | 4/1978 | Grundström et al. | 111/115 |
| 4,090,456 | 5/1978 | Morrison, Jr. et al. | 111/3 |
| 4,444,131 | 4/1984 | Marttinen | 111/115 X |
| 4,829,915 | 5/1989 | Ahm | 111/105 |
| 5,080,027 | 1/1992 | Brothers | 111/99 |

FOREIGN PATENT DOCUMENTS

| 80000 | 5/1933 | Austria | 111/99 |
|---|---|---|---|
| 822738 | 11/1951 | Germany | 111/98 |
| 407927 | 12/1946 | Italy | 111/98 |
| 171012 | 11/1921 | United Kingdom | 111/99 |
| 671192 | 4/1952 | United Kingdom | 111/99 |

Primary Examiner—Randolph A. Reese
Assistant Examiner—Christopher J. Novosad
Attorney, Agent, or Firm—Ronald B. Sefrna

[57] ABSTRACT

A manual plant setting device that enables a gardener to set plants into the ground from a standing position without the need to bend or stoop, having a base plate with a short spud extending downwardly therefrom to be pressed into the soil to form a hole to receive the root ball of a plant to be set in the ground, an elongate plant guide, connected at one end to the base plate offset from the spud and extending upwardly from the base plate, in which a plant is placed and allowed to slide smoothly down the plant guide to the hole prepared to receive the root ball, and a handle interconnected to the opposite end of the plant guide for holding and manipulating the device. In the method of the invention the spud is pressed into the soil to form a hole, a plant is placed in the plant guide and allowed to slide smoothly down the plant guide and into the prepared hole, and the spud is used to place and lightly tamp soil around the root ball of the plant.

19 Claims, 3 Drawing Sheets

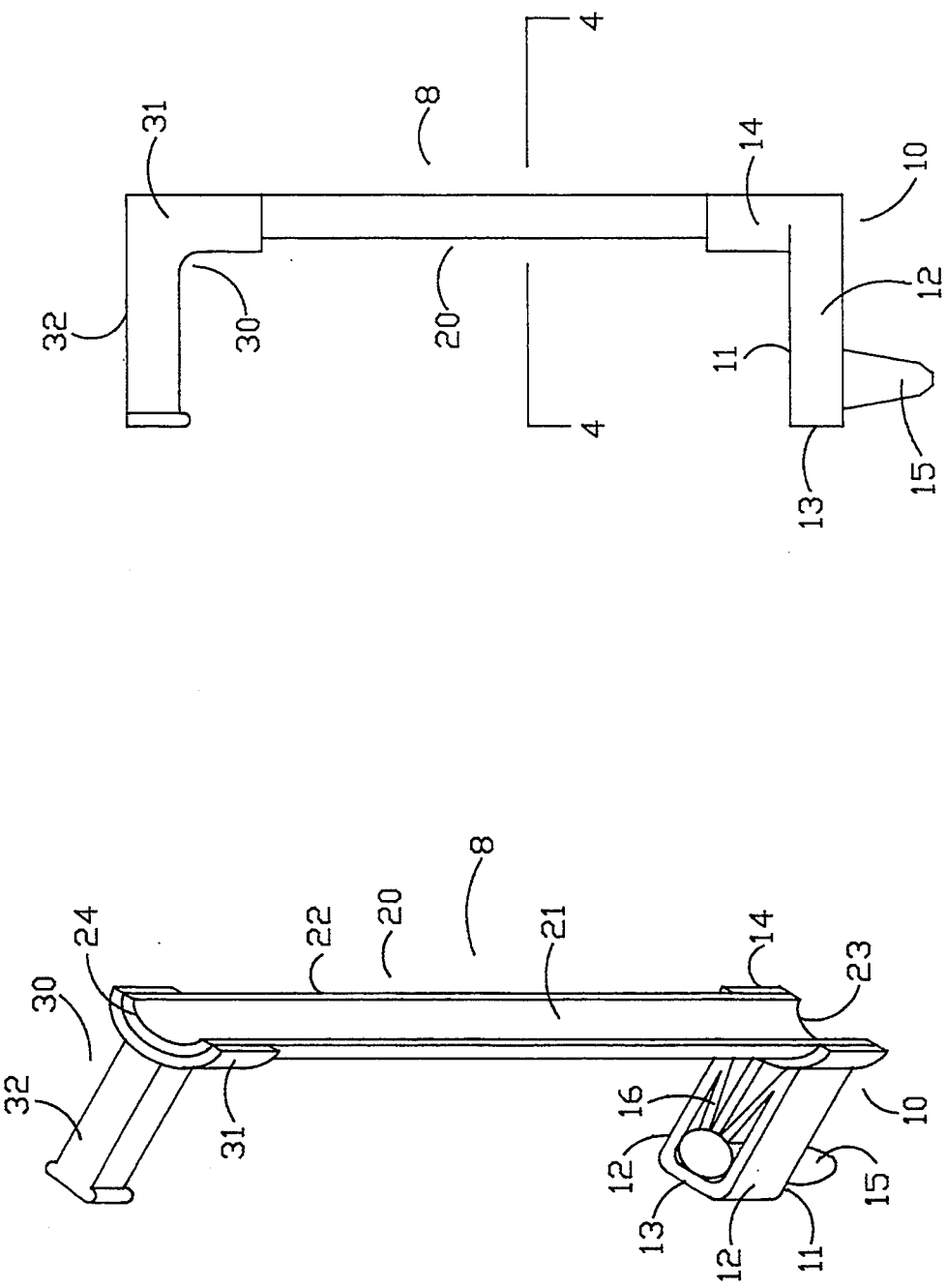

MANUAL PLANT SETTING DEVICE AND METHOD OF SETTING PLANTS

FIELD OF THE INVENTION

The present invention generally relates to gardening implements or devices and in its preferred embodiment more specifically relates to a device for setting plants in the ground and to a method of setting plants without the need for bending or crouching by the user.

BACKGROUND OF THE INVENTION

Gardening and landscaping work, whether performed commercially or for personal use and enjoyment, often involves substantial physical effort. Specifically, transplanting or setting out seedlings and other small plants in the ground in a garden or landscape has required repeated bending and straightening by the person setting the plants. The physical activity associated with gardening can be physically difficult for many persons to perform and is tiring even for those physically able to perform the work.

Efforts have been made to reduce the level of physical activity associated with gardening, including the introduction of mechanized equipment designed to perform certain gardening functions. As an example, U.S. Pat. No. 4,090,456 to Morrison, Jr., et al., discloses an apparatus for automatically opening furrows in soil, placing seeds in the opened furrows, and then closing the furrows. An apparatus for opening a furrow, placing a continuous tape containing seeds or newly germinated bare root plants in the furrow, and closing the furrow is disclosed by U.S. Pat. No. 4,829,915 to Ahm. While effective for their intended purposes, neither the Morrison, Jr. apparatus nor the ahm apparatus enable a user to set individual plants or to set plants that have development much beyond seed germination.

A manual device that may be used for placing seeds is disclosed by U.S. Pat. No. 4,011,612 to Atkinson. The Atkinson device is a combination lawn and garden implement that is adaptable to the performance of several common gardening tasks and includes a hollow enclosed handle and a furrow opening blade. The device may be used to set seeds by dropping the seeds through the handle of the device into a prepared furrow, but the design of the device precludes its use for setting growing plants.

There remains a need for a device for and a method of setting individual plants in individual locations determined by the gardener without the need to stoop or bend to place each plant in the ground.

SUMMARY OF THE INVENTION

The present invention provides a simple device that enables a user to easily open a hole in the ground, place a plant in the hole without excessively disturbing soil surrounding the roots of the plant, and close the soil around the plant in the desired location, all without bending or stooping from a standing position. The present invention further provides a method of setting plants utilizing the device of the invention.

The device of the invention generally comprises a substantially planar base plate, a spud extending downward from and interconnected to the base plate near one end, an elongate concave plant guide extending upward from and interconnected to the base plate near the opposite end of the base plate, and a hand grip interconnected to the upper end of the plant guide. The plant guide is generally parallel to the spud, with both extending in opposite directions from and generally perpendicular to the base plate. The base plate is of sufficient size to allow a gardener to place his or her foot on the base plate over the spud to force the spud into the ground to open a hole to receive a plant. The spud is dimensioned so as to produce a hole of appropriate size to receive the "root ball" of a plant of average size for setting out or transplanting. The plant guide is configured as an open trough of sufficient width to receive the root ball of a plant and allow the root ball and plant to slide down the trough of the guide without restriction. The length of the plant guide is sufficient to extend from the ground surface to a convenient height for a gardener to manipulate the device without bending or stooping, and the grip facilitates the user's grasping and manipulating of the device.

The device of the invention is used by first placing the tip of the spud on the ground surface where a plant is to be placed, and then forcing the spud into the ground until the lower surface of the base plate is against the ground. The device is lifted to remove the spud from the hole formed by the spud and the plant guide is positioned so that the lower edge of the guide is adjacent to and aligned with the hole to receive a plant. A plant is placed in the guide at the upper end with the root ball nearest the hole and the plant stem extending upward from the root ball, and the plant is allowed to slide down the guide and directly into the hole prepared to receive the root ball. The spud may then be used to push soil around the root ball and lightly tamp the soil into position, completing the setting of the plant. The same steps may be repeated for each additional plant to be set.

These and additional features of the preferred embodiments and alternative embodiments of the device and method of the invention will be described in more detail with reference to the accompanying drawing figures.

BRIEF DESCRIPTION OF THE DRAWINGS

FIG. 1 is a perspective view of the preferred embodiment of the plant setting device of the invention.

FIG. 2 is a side elevation view of the preferred embodiment of the device of the invention.

DETAILED DESCRIPTION OF THE INVENTION

Figure 4:
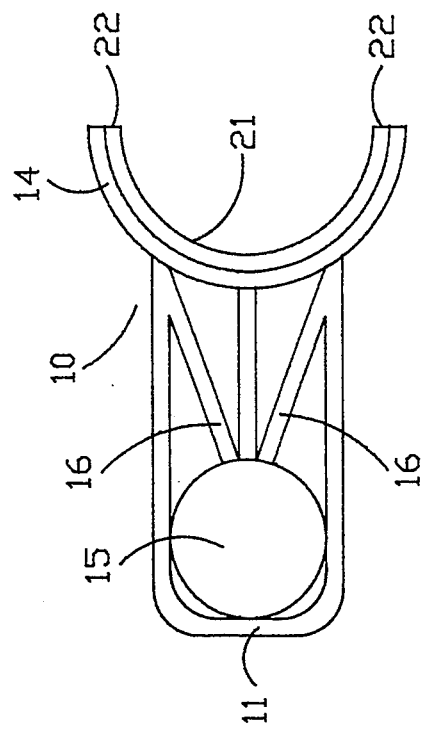
FIG. 4 is a sectioned top plan view of the preferred embodiment of the device of the invention, along line 4—4 of FIG. 2.
Figure 5:
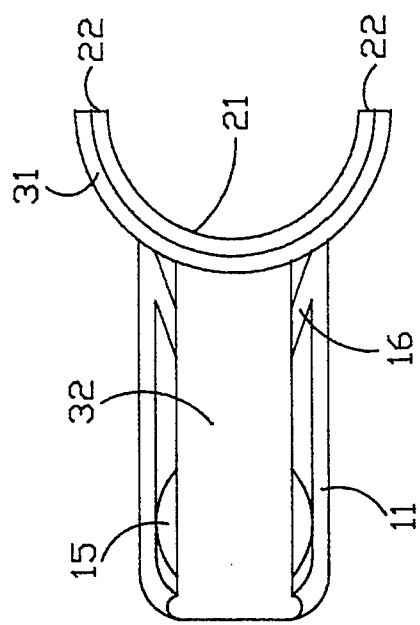
FIG. 5 is a top plan view of the preferred embodiment of the device of the invention.

With reference to the drawing figures, the preferred embodiment of the manual plant setting device of the invention, generally designated by reference numeral 8, includes component assemblies identified as base assembly 10, plant guide 20, and handle assembly 30. Base assembly 10 is interconnected to the lower end of plan guide and grip assembly 30 is interconnected to the upper end of plant guide 20 to form device 8.

Base assembly 10 includes a substantially planar base plate 11, preferably formed with an open interior surrounded by parallel side walls 12, end wall 13, and attachment collar 14, although it will be understood that base plate 11 may be formed in other configurations, such as a continuous plate. In the preferred embodiment, end wall 13 is interconnected between side walls 12 at their first ends, and side walls 12 are interconnected to attachment collar 14 at their second ends. Attachment collar 14 is a curved body, preferably of semi-circular configuration with its longitudinal axis perpendicular to the plane of base plate 11.

Base assembly 10 further includes spud 15 extending through base plate 11 with the longitudinal axis of spud 15 perpendicular to the plane of base plate 11. Spud 15 is disposed in base plate 11 between side walls 12 and adjacent to end wall 13 with the upper end of spud 15 aligned with the upper edges of walls 12 and 13, and is interconnected to side walls 12 and end wall 13 for rigidity. Spud 15 extends downward from the base plate 11 a distance approximately equal to the cross-sectional dimension of the root ball of a plant device 8 is to be used to set. In the preferred embodiment, spud 15 extends from base plate 11 a distance of about three inches. Reinforcing ribs 16 are preferably interconnected between spud 15 and attachment collar 14 to stabilize and add further rigidity to spud 15.

Figure 3:
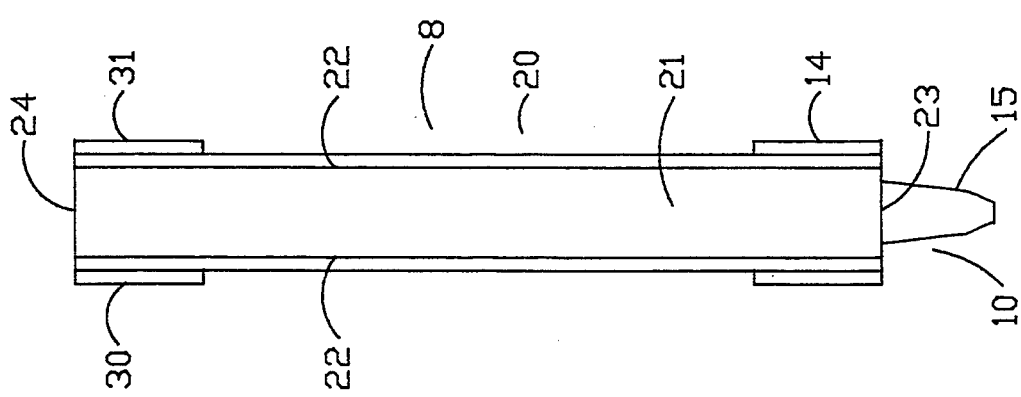
FIG. 3 is a front elevation view of the preferred embodiment of the device of the invention.

As illustrated in FIGS. 2 and 3, spud 15 is an inverted frusto-conical body with a circular cross-section about two inches in maximum diameter, to be forced into the ground to open a hole of appropriate size and configuration to receive the root ball of a plant that is set using the device of the invention. It is preferred that the sides of spud 15 be inclined, to facilitate entry into the ground and to provide a hole with sloping sides, but the scope of the invention is not limited to any particular configuration and it will be understood that a wide range of configurations may be effectively utilized.

Plant guide 20 comprises an elongate trough-like body 21 with elongate edges 22, an open first end 23 and an open second end 24. It is preferred that body 21 be of semi-circular cross-sectional configuration to provide a smooth slide for plants, but it will be understood that other configurations consistent with the function of guide 20 may be used. The length of body 21 is such that second end 24 is at a convenient height for grasping by a user without bending or stooping with first end 23 at the surface of the ground. In the preferred embodiment the length of body 21 is about thirty-six inches and the width between edges 22 is about two inches.

Grip assembly 30 preferably includes attachment collar 31 with handle 32 interconnected thereto and extending outwardly therefrom. As illustrated in the drawing figures, attachment collar 31 is a curved body of semi-circular configuration, generally identical to attachment collar 14 of base assembly 10. Handle 32 extends outwardly from attachment collar 31 with its longitudinal axis perpendicular to the longitudinal axis of attachment collar 31 and perpendicular to a plane defined by the edges of attachment collar 31. Handle 32 may be of any convenient configuration that may be comfortably grasped by the hands of a user of device 8.

In the preferred embodiment of the device of the invention, base assembly 10 and grip assembly 30 are connected to opposite ends of plant guide 20 with the longitudinal axis of handle 32 parallel to the longitudinal axis of base plate 11, with the longitudinal axes of handle 32 and of base plate 11 mutually perpendicular to the longitudinal axis of plant guide 20 and with the respective edges of attachment collars 14 and 31 aligned with edges 22 of body 21. It is preferred that device 8 be constructed of a moldable plastic material, such as polyvinyl chloride (PVC), with base assembly 10, plant guide 20, and grip assembly 30 formed as separate components and connected by adhesive, though any suitable material and attachment means may be utilized.

Figure 6:
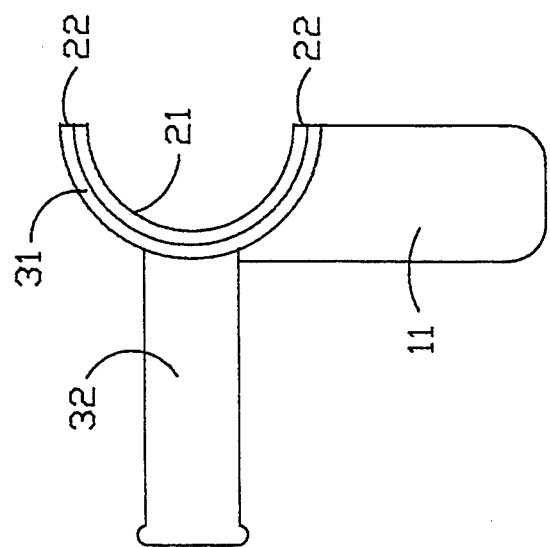
FIG. 6 is a top plan view of an alternative embodiment of the device of the invention.

The device of the invention is susceptible to various structural modifications and alternative embodiments within the scope of the invention. For example, base assembly 10 and grip assembly 30 may be disposed on plant guide 20 with the longitudinal axes of base plate 11 and handle 32 in perpendicular rather than parallel relation, as shown in FIG. 6. Further, base plate 11 may be formed as a solid plate rather than with an open interior, as also shown in FIG. 6. Additionally, attachment collars 14 and 31 may be omitted and base plate 11 and handle 32 connected directly to plant guide 20, if desired.

Figure 7:
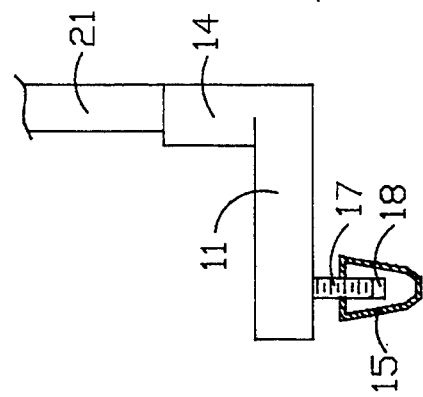
FIG. 7 is a sectioned partial side elevation view of an alternative embodiment of the base assembly of the device of the invention.
Figure 8:
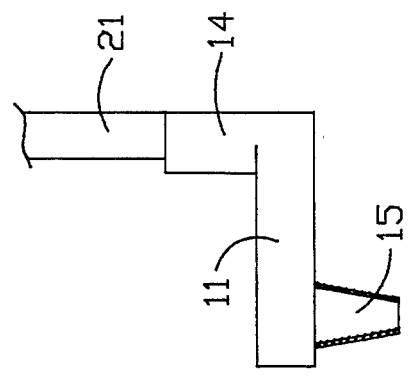
FIG. 8 is a sectioned partial side elevation view of a further alternative embodiment of the base assembly of the device of the invention.

In further alternative embodiments the structure of spud 15 may be modified. Spud 15 may be adjustable in length by connecting a threaded rod 17 to the lower surface of base plate 11, providing a central threaded aperture 18 in spud 15, and threading spud 15 onto the threaded rod, as illustrated in FIG. 7. Spud 15 may also be adapted to function as a "plug cutter" by forming the spud as a hollow open ended body with a continuous side wall, as shown in FIG. 8, such that the side wall cuts into the soil rather than moving soil laterally as spud 15 is forced into the ground.

In the method of the invention, device 8 is used to set plants by placing the tip of spud 15 on the surface of the ground in a location where a plant is to be set, and then pushing spud 15 into the ground to form a hole to receive the root ball of the plant. It will be understood that such holes will be most easily formed if the soil in the area to be planted is loose and friable, through initial working of the soil is not an essential step. When the planting hole has been formed the spud is lifted from the hole and the lower end of plant guide 20 is positioned adjacent to the hole. The device should be tilted slightly so that the plant guide is angled from the vertical. A plant is placed in the plant guide 20 at any point convenient for the user, oriented with the roots and surrounding soil nearest the lower end of the plant guide and the plant stem extending upwardly. The plant is then released and allowed to slide smoothly down the plant guide and into the prepared hole. Spud 15 may then be used to push soil around the plant and to lightly tamp the soil in place. The user may then move to the next planting location and repeat the described steps to set as many plants as desired. With the device and method of the invention, a gardener is able to rapidly and easily set any number of plants without the need to bend or stoop at any time during the planting process.

The foregoing description of the preferred and alternative embodiments of the device of the invention and of the method of the invention is illustrative and not for purposes of limitation. Both the device and the method are susceptible to various additional modifications and alternatives without departing from the scope and spirit of the invention as claimed.

What is claimed is:

1. A manual plant setting device, particularly useful for setting seedling plants in a prepared soil bed, comprising an elongate trough-like main body open along its length, having a longitudinal axis and first and second ends, said main body being curved in cross-sectional configuration and having a concave surface and a convex surface;

a substantially planar base plate having a longitudinal axis, first and second ends, and upper and a lower faces, said base plate being interconnected at its first end to said convex surface of said main body at the second end of said main body and extending outwardly from said main body with the longitudinal axis of said base plate generally perpendicular to the longitudinal axis of said main body;

a spud for opening a hole in the soil to receive a plant therein, said spud having a longitudinal axis and first and second ends, and said spud being interconnected at its first end to the lower face of said base plate and extending outwardly therefrom with the longitudinal axis of said spud generally perpendicular to said lower face of said base plate and with the second end of said spud extending beyond said second end of said main body; and handle means interconnected to said convex surface of said main body at the first end of said main body and extending outwardly therefrom.

2. The manual plant setting device of claim 1, wherein said spud comprises an elongate body of circular cross-sectional configuration, narrowing in diameter from said first end thereof to said second end thereof and closed at said second end.

3. The manual plant setting device of claim 1, wherein said handle means comprises an elongate body having a longitudinal axis and first and second ends, and wherein said body of said handle means is interconnected at its first end to said convex surface of said main body and extends outwardly therefrom with the longitudinal axis of said body of said handle means generally perpendicular to the longitudinal axis of said main body.

4. The manual plant setting device of claim 3, wherein said handle means includes an attachment collar curved in cross-sectional configuration and having a concave surface and a convex surface, with said concave surface matching the curvature of and interconnected to said convex surface of said main body at said first end thereof, and with said first end of said body of said handle means interconnected to said convex surface of said attachment collar.

5. The manual plant setting device of claim 3, wherein said longitudinal axis of said body of said handle means is parallel to said longitudinal axis of said base plate.

6. The manual plant setting device of claim 3, wherein said longitudinal axis of said body of said handle means is disposed at an angle of about ninety degrees relative to said longitudinal axis of said base plate.

7. The manual plant setting device of claim 1, wherein said base plate further includes an attachment collar curved in cross-sectional configuration and having a concave surface and a convex surface, with said concave surface matching the curvature of and interconnected to said convex surface of said main body at said second end thereof, and with said first end of said base plate interconnected to said convex surface of said attachment collar.

8. The manual plant setting device of claim 7 wherein said base plate further includes a pair of opposed side walls interconnected to and extending outwardly from said attachment collar, and an end wall interconnected between said side walls at said second end of said base plate, said side walls, end wall, and attachment collar surrounding an open interior, and wherein said first end of said spud is disposed in said open interior and said spud is interconnected to said 9. The manual plant setting device of claim 8, wherein said base plate further includes reinforcing ribs interconnected between said spud and said attachment collar within said open interior of said base plate.

10. The manual plant setting device of claim 1, wherein said main body is semi-circular in cross-sectional configuration.

11. The manual plant setting device of claim 1, wherein said base plate further includes a threaded rod interconnected to and extending from said lower face of said base plate near said second end thereof, wherein said spud includes a threaded aperture extending into the interior of said spud along said longitudinal axis thereof from said first end thereof, and wherein said spud is interconnected said base plate by threading said spud onto said threaded rod, such that the distance between said second end of said spud and said lower face of said base plate is adjustable.

12. The manual plant setting device of claim 1, wherein said spud is an inverted hollow frusto-conical body open at said second end thereof.

13. A device for setting plants, comprising an elongate straight trough-like main body with a longitudinal axis, a first end, and a second end, said main body being curved in cross-sectional configuration with a concave surface and a convex surface;

a base assembly having an curved attachment collar with a curvature matching the cross-sectional configuration of said main body,s aid attachment collar having a concave surface and a convex surface, a first end and a second end, interconnected to said main body with said concave surface of said attachment collar received against said convex surface of said main body and with said second end of said attachment collar aligned with said second end of said main body, a pair of opposed side walls each with first and second ends, each interconnected at its first end to said convex surface of said attachment collar and extending outwardly therefrom, an end wall interconnected between said second ends of said side walls, and a spud interconnected to said side walls and to said end wall and extending therefrom beyond said second end of said attachment collar; and a grip assembly having an curved attachment collar with a curvature matching the cross-sectional configuration of said main body, said attachment collar having a concave surface and a convex surface, a first end and a second end, interconnected to said main body with said concave surface of said attachment collar received against said convex surface of said main body and with said first end of said attachment collar aligned with said first end of said main body, and a handle with first and second ends, interconnected at its first end to said convex surface of said attachment collar and extending outwardly therefrom.

14. The device of claim 13, wherein said base assembly further includes reinforcing ribs interconnected between said spud and said attachment collar.

15. The device of claim 13, wherein the length of said main body is about thirty-six inches.

16. The device of claim 13, wherein the direction of extension of said base assembly from said main body is the same as the direction of extension of said handle from said main body.

17. The device of claim 13, wherein the direction of extension of said base assembly from said main body is offset from the direction of extension of said handle from said main body by an angle of about ninety degrees.

18. A method of setting plants in the soil using a plant setting device having an elongate trough-like main body forming a concave plant guide, a generally planar base extending outward from and generally perpendicular to the main body at the lower end of the main body, and having a spud attached to the base and extending downward therefrom with the tip of the spud disposed below the lower end of the main body, comprising the steps of
placing the tip of the spud on the surface of the soil in a location where a plant is to be set;
imposing downward force on the base to force the spud into the soil, opening a hole in the soil to receive the roots of a plant and surrounding soil;
lifting the device to remove the spud from the hole;
placing the lower end of the main body of the device adjacent to the hole;
placing a plant in the concavity of the main body with the roots of the plant and any surrounding soil nearer the lower end of the main body and the stem of the plant extending upward; and
releasing the plant such that the plant slides down the concavity of the main body until the roots of the plant and any surrounding soil are received in the hole formed by the spud.

19. The method of claim 18, including the additional step of pushing and tamping soil around the roots of the plant.

* * * * *